United States Patent [19]

Brubaker

[11] 3,711,599
[45] Jan. 16, 1973

[54] METHOD OF PREPARING FIBROUS MAGNESIUM OXIDE
[75] Inventor: Burton D. Brubaker, Midland, Mich.
[73] Assignee: The Dow Chemical Company, Midland, Mich.
[22] Filed: April 13, 1970
[21] Appl. No.: 28,103

Related U.S. Application Data

[63] Continuation-in-part of Ser. No. 622,046, March 10, 1967, abandoned.

[52] U.S. Cl. ..................423/638, 423/636, 423/639
[51] Int. Cl. ............C01f 5/06, C01f 5/10, C01f 5/12
[58] Field of Search ............23/183, 201; 106/55, 58

[56] References Cited

UNITED STATES PATENTS 2,191,561  2/1940  Farnsworth..........................23/201 X
1,325,932  12/1919  Dutt.........................................23/201

FOREIGN PATENTS OR APPLICATIONS 497,119  12/1938  Great Britain..........................23/301

OTHER PUBLICATIONS

Pavlyuchenko et al.; "Chemical Abstract" Vol. 64, 1966, Col. 12,183(b)

Primary Examiner—Edward J. Meros
Attorney—Griswold & Burdick, Stephen S. Grace and William R. Norris

[57] ABSTRACT

This specification discloses a method of preparing fibers of magnesium oxide, nickel oxide, and solid solutions thereof by forming a liquid film of reaction mixture containing a magnesium or nickel salt and as auxiliary salt; reacting said film mixture with water vapor to initiate fibrous growth at a temperature of from about 700°C to 1,200°C; continually supplying a film mixture over the fibers to sustain growth; and separating the fibers from any residual mixture, thereby to produce said fibers which are characterized by unusually high tensile strength and resistance to high temperatures.

6 Claims, No Drawings

METHOD OF PREPARING FIBROUS MAGNESIUM OXIDE

This application is a continuation-in-part of Ser. No. 622,046, filed Mar. 10, 1967 now abandoned.

A primary object of the present invention is to provide a new and novel method of preparing fibers or so-called whiskers of magnesium oxide, nickel oxide and/or solid solutions thereof, which is relatively simple to carry out, lower in cost than the prior art methods of making such fibers, and which has the capability of producing large yields of the fibrous product.

The above and other objects and advantages are obtained in accordance with the present invention in a method comprising: (a) forming a liquid film of a mixture of a metal salt with at least one auxiliary salt, the proportion of said metal salt being within the range of from about 2 to about 90 mole percent of the mixture; (b) reacting said mixture with water vapor at a temperature within a range of from about 700°C to about 1,200°C and preferably from about 800°C to about 1,100°C to initiate metal oxide fiber growth; (c) continually supplying a liquid film of said mixture over the fibers to sustain growth; and (d) separating the fibrous metal oxide product from any residual mixture, for example, by treating it with an aqueous leaching solution. The fibrous oxide product so-prepared and obtained comprises, after drying, a loosely packed, bulky, fibrous mass of magnesium oxide, nickel oxide, or solid solutions thereof having a low density, the individual fibers having high tensile strength and high temperature resistant properties.

The term "auxiliary salt" as used herein means the alkali metal chlorides and bromides, alkali metal sulfates, calcium, barium or strontium chlorides, or mixtures thereof, employed in a reaction mixture with particular magnesium or nickel inorganic salts as hereinafter specified.

The term "metal salt" means the chlorides, bromides and sulfates of magnesium, nickel or mixtures thereof.

In carrying out the process of the present invention a metal salt is admixed with at least one auxiliary salt to form the reaction mixture. A double salt such as, e.g., carnallite (MgCl$_2$·KCl·6H$_2$O) may also be conveniently used. In such instance, no separate addition of auxiliary salt is necessary. A mixture of magnesium or nickel chloride together with either a sodium, lithium or potassium halide salt or calcium chloride is preferred as the reaction mixture composition. Various other combinations of e.g., the magnesium salt and auxiliary salts may also be employed in the composition. When solid solutions of magnesium oxide and nickel oxide fibers are desired, the composition will comprise a mixture of magnesium or nickel salts in amounts within those specified herein depending on the solid solution fiber composition desired.

When magnesium chloride is employed as the metal salt with alkali metal chlorides or bromides, such as, for example, the chlorides or bromides of sodium, lithium or potassium, the magnesium chloride is normally employed in an amount of from about 2 to about 90 mole percent, i.e. from 2 to 90 moles per hundred moles of reaction mixture. When magnesium chloride is used in the reaction mixture with calcium, barium or strontium chloride auxiliary salt, normally from 2 to 40 mole percent of the magnesium chloride is employed. This 40 percent limitation can be increased as and if sodium, lithium, or potassium halide auxiliary salts are added to said calcium, barium, or strontium salts in increasing amounts.

When magnesium bromide is used together with, e.g. sodium, lithium, or potassium chloride or bromide salts, from 5 to 75 mole percent of the magnesium salt is normally used. However, the calcium, barium or strontium halide auxiliary salts are substantially inoperable in the reaction composition with magnesium bromide.

Magnesium sulfate is normally employed in an amount of from about 2 to about 50 mole percent in combination with sodium, lithium, or potassium chloride or bromide auxiliary salts in the reaction composition. With calcium, barium, or strontium halide chloride auxiliary salts, the magnesium sulfate is used in an amount of from about 2 to about 30 mole percent.

In preparing the metal oxide fibers a liquid film of the mixture is formed. This is accomplished, for example, by pouring the mixture in molten form on a flat or inclined substrate, or, since the mixture is highly wettable, by allowing the liquid to flow up the side of a reaction vessel, e.g. a crucible. To initiate fibrous metal oxide growth, the film mixture is reacted with water vapor, e.g. in the atmosphere surrounding the film, at a temperature within the range from about 700°C to 1,200°C, preferably 800°C to 1,100°C. The time of reaction at the temperature specified preferably should be maintained for at least about 30 minutes, and more preferably for about 2 hours to about 5 hours. Heating times greater than about 5 hours do not significantly increase the fiber length over that obtained during the 2 to 5 hours heating time. It is, however, not particularly detrimental if greater times are employed.

During reaction, metal oxide is formed by the reaction of the metal ion (M$^{++}$) with a hydroxyl ion (OH$^-$) and an anion (X$^-$):

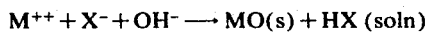

The hydroxyl ions are formed by reaction of the water vapor with an anion (X$^-$)

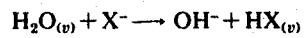

Where the reaction mixture is a thick mass, the metal oxide forms as granular crystals. However, when the reaction takes place in a film of reaction mixture, as specified in the present method, the growth is unidirectional, causing metal oxide fiber to form. This is due in part to the selective reaction of the hydroxyl ions with the closest edge of the metal oxide nuclei. The "top" of the nucleus, e.g. the edge nearest the film surface, reacts with the hydroxyl ions more readily than the "sides" of the nucleus which are shielded by the mixture film.

To sustain the fibrous growth a liquid film of mixture is continually supplied over the fibers, e.g. by continually pouring molten mixture over the fibers to maintain a film or allowing capillary action to "crawl" or "siphon" a liquid film over the growing fibers.

When the fibers reach the desired length, e.g. a few microns to 10,000–12,000 microns, the fibers are separated from any residual mixture. The fibers are contacted with an aqueous solution to leach out the soluble mixture leaving behind the metal oxide fibrous product, which is thereafter normally dried either in an oven at moderate temperatures such as, e.g. 100°C or air dried at ambient temperatures.

As an alternative to leaching out the auxiliary salts, where little or no unreacted magnesium salts are present, the fibers can be further heated to vaporize off the auxiliary salts leaving the metal oxide fibers as product.

The fibrous oxide yield from the present novel process varies depending on the reaction time, temperature, atmosphere, and reaction composition. In general, the fiber yields can vary from, e.g. about 20 to about 75 percent, based on a 100 percent conversion of the magnesium or nickel salt in the reaction mixture to the fibrous oxide.

The following examples serve to illustrate the present novel process.

Example I

A sample of natural carnallite salt from Cardona, Suria, Spain weighing about 40 grams was placed in a "Vycor" brand crucible (crucible comprising about 96 percent silica). Carnallite ($MgCl_2 \cdot KCl \cdot 6H_2O$) is an example of a naturally occurring double salt which does not require the separate addition of an auxiliary salt. The crucible and contents were placed in a furnace preheated to about 900°C. The crucible was actually maintained at the 900°C temperature for about 1.5 hours. The furnace had openings so that air circulation could take place and gaseous byproducts could be exhausted. The dew point of the air so-circulated was about 2°C.

Upon heating, the carnallite became molten and crawled up the side and over the top of the crucible, forming a film on the inner and outer sides of the crucible. The mixture reacted with the water vapor in the atmosphere to form magnesium oxide fibers on the inner and outer sides of the crucible, with the maximum deposit being at the rim. A film of liquid mixture from the reservoir in the crucible was continually supplied over the fibers by capillary action. The fibers were cooled and leached in water to remove any residual carnallite. The magnesium oxide fibers so-deposited were from about 100 microns to about 2,500 microns in length. The majority of fibers were about 2,000 microns in length. A 42 percent conversion or yield was obtained.

Example II

A number of binary reaction compositions were prepared using magnesium chloride (or its hexahydrate) and various alkali metal and alkaline earth metal auxiliary "inert" salts. The composition of these binaries is shown in Table I below. Each binary reaction composition was placed in a Vycor crucible and the crucible heated in an oven to temperatures and for times as indicated in Table I. An ambient air atmosphere was maintained over the reaction as it proceeded, having a sufficient dew point for growth of fibers in accordance with the present invention. The mechanisms for the formation of the liquid film of mixture, the reaction of the mixture with water vapor, the continued supplying of film, and the separation of fibers were the same as Example I. The magnesium oxide fiber lengths noted are a reasonable average of the range of fiber lengths produced as determined by optical microscopy.

TABLE I a. ($MgCl_2$ salt + potassium chloride auxiliary salt)

| Mole % $MgCl_2$ | Heating Time Hours | Temp °C | Fiber Length in Microns |
|---|---|---|---|
| 90 | 2 | 900 | 60 |
| 75 | 2 | 900 | 40 |
| 60 | 2 | 900 | 3500 |
| 50 | 2 | 900 | 1300 |
| 40 | 2 | 900 | 2000 |
| 25 | 2 | 900 | 700 |
| 10 | 2 | 900 | 40 |
| 2 | 2 | 900 | 500 | b. ($MgCl_2$ salt + sodium chloride auxiliary salt)

| 5 | 3 | 900 | 700 |
| 10 | 3 | 900 | 400 | c. ($MgCl_2$ salt + lithium chloride auxiliary salt)

| 5 | 3 | 900 | 1000 |
| 10 | 3 | 900 | 400 | d. ($MgCl_2$ salt + cesium chloride auxiliary salt)

| 68 | 2.5 | 900 | 300 | e. ($MgCl_2$ salt + KBr auxiliary salt)

| 50 | 2 | 900 | 300 | f. ($MgCl_2$ salt + calcium chloride auxiliary salt)

| 30 | 3 | 900 | 80 |
| 20 | 3 | 900 | 200 |
| 10 | 3 | 900 | 400 |
| 5 | 3 | 900 | 500 | g. ($MgCl$ salt + potassium chloride and other auxiliary salt)

| Mole percent $MgCl_2$ | KCl | Other | Time Hours | Temp °C | Fiber Length | Yield |
|---|---|---|---|---|---|---|
| 54.7 | 36.4 | 8.9 $CaCl_2$ | 18 | 900 | 150 | 50 |
| 30 | 30 | 40 $CaCl_2$ | 20 | 900 | 100 | 75 |
| 12.7 | 35.8 | 51 $LiCl$ | 2 | 800 | 300 | 30 |
| 6.1 | 38.5 | 55.4 $LiCl$ | 2.75 | 700 | 300 | |

Example III

Similarly as in Example II above various binary reaction compositions were prepared and heated for the periods and at the temperatures indicated to produce fibers of magnesium oxide. These compositions contained various magnesium salts (Mg) and various auxiliary salts (A.S.). The results are recorded in Table II below indicated proportions or reactants, heating time in hours, temperature in °C, and fiber length in microns, relative to each composition.

TABLE II

| Reactants and Proportions Thereof | | Temp °C | Time Hours | Fiber Length |
|---|---|---|---|---|
| 1. $MgCl_2$ $K_2SO_4$ (AS) | Equimolar | 900 | 2 | 600 |
| 2. $MgBr \cdot nH_2O$ KCl (AS) | 72.3 wt. % 24.7 wt. % | 900 | 2 | 500 |
| 3. $MgBr \cdot nH_2O$ KBr (AS) | 33.3 wt. % 66.7 wt. % | 900 | 1.5 | 200 |
| 4. $MgSO_4$ KCl (AS) | 40 mole % 60 mole % | 900 | 2 | 80 |
| 5. $MgSO_4$ $CaCl_2$ (AS) | 10 mole % 90 mole % | 900 | 2 | 500 |
| 6. $MgSO_4 \cdot 7H_2O$ $K_2SO_4$ | Equimolar | 1200 | 2 | 600 |

Example IV

About 19 pounds of carnallite magnesium salt, and about 5 pounds of calcium chloride were heated in a fused quartz crucible for 4 hours at 850°C, then cooled. The mechanisms for the formation of the liquid film of mixture, the reaction, the continued supplying of film and the separation of fibers were the same as Example I. A fibrous magnesium oxide product was obtained wherein fibers obtained a length of about one-half an inch.

Example V

About 40 grams of carnallite magnesium salt and 20 grams of $CaCl_2$ were heated as in Example IV for about 2.5 hours at 800°C. A fibrous magnesium oxide product was obtained wherein the maximum fiber length was greater than about 4,000 microns.

Example VI

Various reaction mixtures were prepared containing nickel chloride ($NiCl_2·6H_2O$), magnesium chloride ($MgCl_2$), and as auxiliary salts potassium chloride (KCl) and calcium chloride ($CaCl_2$), then heated in a crucible for the time (hours), and at the centigrade temperature (°C) indicated in Table III in a gaseous atmosphere having a dew point (°C) of at least −15°. Upon heating, the liquid mixture wet the crucible walls forming a film. Reaction of the mixture with water vapor caused formation of solid solution fibers. Liquid mixture was supplied by capillary action. Magnesium oxide-nickel oxide solid solution fibers of varying length were obtained. The reaction condition, and proportions of materials are presented in said Table III.

TABLE III

| Sample No. | Mole percent of— | | | | Time, hours | Temp., °C. | Fiber composition in mole percent | | Fiber length | Mole ratio in starting composition of Ni-to-Mg |
|---|---|---|---|---|---|---|---|---|---|---|
| | $NiCl_2·6H_2O$ | $MgCl_2$ | KCl | $CaCl_2$ | | | NiO | MgO | | |
| 1 | 2.5 | 22.3 | 66.3 | 8.9 | 2 | 900 | 18 | 82 | 125 | 1:9 |
| 2 | 7.4 | 17.3 | 66.4 | 8.9 | 2 | 900 | 45 | 55 | 125 | 3:7 |
| 3 | 12.4 | 12.4 | 66.3 | 8.9 | 2 | 900 | 57 | 43 | 300 | 1:1 |
| 4 | 17.3 | 7.5 | 66.3 | 8.9 | 2 | 900 | 73 | 27 | 750 | 7:3 |
| 5 | 22.3 | 2.5 | 66.3 | 8.9 | 2 | 1,000 | 91 | 9 | 300 | 9:1 |
| 6 | 22.3 | 2.5 | 66.3 | 8.9 | 2 | 850 | | | 400 | 9:1 |
| 7 | 22.3 | 2.5 | 66.3 | 8.9 | 2 | 950 | | | 400 | 9:1 |
| 8 | 22.3 | 2.5 | 66.3 | 8.9 | 2 | 1,000 | | | 500 | 9:1 |
| 9 | 13.2 | 1.5 | 75.2 | 10.1 | 2 | 1,000 | | | 1,400 | 9:1 |
| 10 | 8.4 | 0.94 | 79.9 | 10.7 | 2 | 1,000 | | | 800 | 9:1 |
| 11 | 12.9 | 1.4 | 73.4 | 12.3 | 1 | 1,000 | | | 600 | 9:1 |

Example VII

Nickel oxide fibers in substantial length were prepared in accordance with the present invention by heating mixtures of $NiCl_2·6H_2O$, $CaCl_2$ and KCl in varying proportions for periods from 2 to 3 hours at temperatures from 800°C to 1,000°C. The fiber lengths obtained and the reaction conditions are presented in Table IV below:

TABLE IV

| Sample No. | Mole Per Cent of | | | time hrs. | temp °C | Length |
|---|---|---|---|---|---|---|
| | $NiCl_2·6H_2O$ | $CaCl_2$ | KCl | | | |
| 1 | 5 | 0 | 95 | 3 | 900 | 400 |
| 2 | 10 | 0 | 90 | 3 | 900 | 500 |
| 3 | 20 | 0 | 80 | 3 | 900 | 350 |
| 4 | 40 | 0 | 60 | 3 | 900 | 300 |
| 5 | 10 | 0 | 90 | 2 | 800 | 50 |
| 6 | 16 | 15 | 69 | 2 | 1000 | 700 |
| 7 | 20 | 47 | 33 | 2 | 1000 | 250 |

Other combinations of magnesium or nickel salts or mixtures thereof with one or more auxiliary salts in accordance with the present invention can be processed to provide nickel oxide or magnesium oxide fibers of substantial length characterized by high tensile strengths and resistance to high temperatures similarly as hereinbefore specified.

The present invention may be modified or changed without departing from the spirit, scope, or substance of the present invention and it is understood that the invention is only limited as defined in the appended claims.

What is claimed is:

1. A method for preparing magnesium oxide fibers which comprises:
    a. providing a mixture selected from a member of the group consisting of
    from about 2 to about 90 mole percent magnesium chloride with the balance at least one auxiliary salt selected from the group consisting of the chlorides and bromides of sodium, lithium and potassium,
    from about 2 to about 40 mole percent magnesium chloride and the balance at least one auxiliary salt selected from the group consisting of the chlorides of calcium, barium and strontium,
    from about 5 to about 75 mole percent magnesium bromide and the balance at least one auxiliary salt selected from the group consisting of chlorides and bromides of sodium, lithium and potassium,
    from about 2 to about 50 mole percent magnesium sulfate and the balance at least one auxiliary salt selected from the group consisting of the chlorides and bromides of sodium, lithium and potassium,
    from about 2 to about 30 mole percent magnesium sulfate and the balance at least one auxiliary salt selected from the group consisting of the chlorides of calcium, barium and strontium;
    b. forming a nucleus of magnesium oxide on a solid substrate wetted by a molten mixture of step (a) by reacting the mixture of step (a) with water vapor at a temperature within the range of from about 700°C. to 1,200°C.;
    c. forming a molten film with the mixture of step (a) over the nucleus;
    d. reacting a portion of the film over the nucleus with water vapor at a temperature within the range of from about 700°C. to 1,200°C. to thereby produce a fiber by unidirectional growth of the magnesium oxide reaction product;
    e. continually supplying for at least about 30 minutes the liquid film over the fiber ends to sustain only unidirectional growth of the magnesium oxide;
    f. separating the magnesium oxide fibers from any residual mixture; and
    g. recovering a fibrous mass of magnesium oxide.

2. The method of claim 1 wherein the reaction is carried out at a temperature range of from about 800°C to about 1,100°C.

3. The method of claim 1 wherein the molten film of step (c) is formed by pouring the molten mixture of step (b) onto an inclined substrate.

4. The method of claim 1 where the liquid film of step (c) is formed by continually supplying the molten mixture of step (b) to the fiber ends by capillary action.

5. The method of claim 1 wherein the mixture contains magnesium chloride.

6. The method of claim 1 wherein the mixture contains magnesium sulfate.

* * * * *